John B. Damrel, Jr.
Jerry L. Fruit
INVENTORS

United States Patent Office 3,548,632
Patented Dec. 22, 1970

---

3,548,632
APPARATUS FOR CALIBRATING ALTIMETERS, AIR SPEED INDICATORS, ETC.
John B. Damrel, Jr., and Jerry L. Fruit, Houston, Tex., assignors to Texas Instruments Incorporated, Dallas, Tex., a corporation of Delaware
Continuation of application Ser. No. 565,478, July 15, 1966. This application Dec. 30, 1968, Ser. No. 788,159
Int. Cl. G01l 27/00
U.S. Cl. 73—4      9 Claims

ABSTRACT OF THE DISCLOSURE

An air data test apparatus which, in one embodiment, is comprised of two Bourdon tube pressure gauges suitably interconnected such that one gauge can test altimeters by generating test fluid pressure and indicate absolute pressure and altitude while the other gauge can test air speed meters by generating the algebraic difference of the pitot tube or total pressure and the absolute pressure existent at a predetermined altitude.

---

Figure 1:
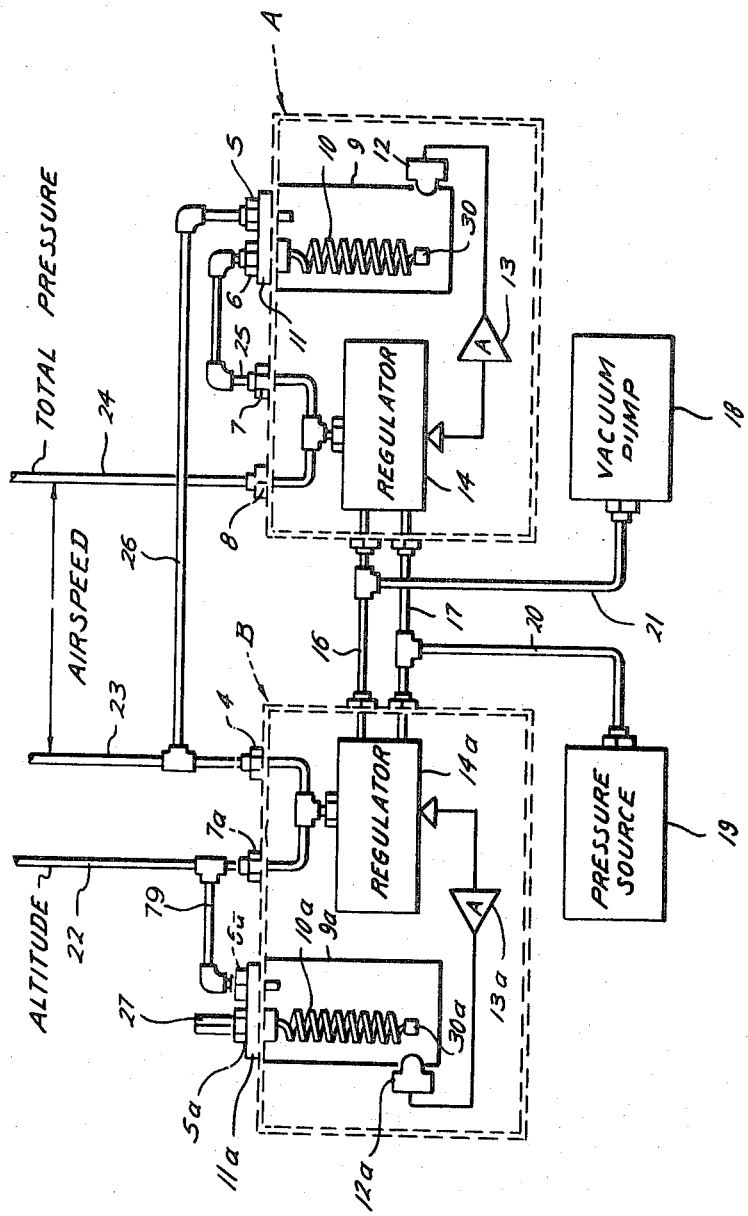

This is a continuation of application Ser. No. 565,478 filed July 15, 1966, now abandoned.

This invention relates to test equipment for air data instruments such as air data computers, altimeters, air speed indicators, and mach meters.

Heretofore, test devices for such instruments have utilized either dead weight or manometric units which have been heavy and/or bulky so as to lack ready portability, have required corrections as for local gravity and temperature, have required substantial maintenance effort, and have not been sufficiently versatile for full use in testing air data computers, for instance, both in generating datum pressures and in measuring unknown pressures applied to the computers and like instruments. For instance, mercury manometer test devices, generally, are adequate for pressure measuring but inadequate as pressure generators. Furthermore, the mercury requires frequent cleaning, the range of such meters is limited by practical size limitations, and substantial time is required in obtaining a reading to permit the mercury level to settle down. Moreover, such meters are heavy and bulky.

The dead weight type of test device is essentially a known pressure generator, these devices not being very practical as pressure measuring units due to the necessity of providing different weights corresponding to different pressures. Maintenance is necessary in assuring continued smooth operation of the weight; gravity, temperature, air buoyancy, and bell jar pressure corrections are necessary; and considerable time usually is required in changing the weights.

Accordingly, an object of the present invention is to provide air data test apparatus which may be effectively and easily used both to generate test pressures and measure unknown pressures.

Another object is to provide air data test apparatus which is relatively light in weight, compact in size, and conveniently portable.

Another object is to provide such apparatus which is simple of operation yet exceptionally fast and accurate.

Another object is to provide air data test apparatus which requires substantially less maintenance than previous equipment for the same purpose.

Still another object is to provide air data test apparatus which will readily and accurately measure and/or control absolute and differential pressures as necessary in testing air data instruments.

The air data test apparatus according to the present invention comprises a pair of Texas Instruments Incorporated pressure gauges, as covered in greater detail in U.S. Pat. No. 3,286,529. This gauge consists of an encapsulated, fuzed quartz Bourdon tube carrying a mirror at its free end which cooperates with an optical transducer to indicate deflection of the tube. The gauge is exceptionally stable and accurate, is largely independent of temperature variations and gravity, is substantially free of hysteresis, and is easily adaptable to various ranges, as further explained in said patent. Each gauge is incorporated in an automatic pressure unit which includes the optical transducer mentioned and regulating means. One of the pressure units is arranged for testing altimeters by generating test fluid pressure or to indicate absolute pressure and altitude, its Bourdon tube being highly evacuated and its surrounding capsule being subjected to static atmospheric pressure, actual or simulated. The other automatic pressure unit is designed for testing air speed meters, its capsule being charged at the absolute pressure, actual or simulated, existent at a predetermined altitude and the Bourdon tube being supplied with pitot tube or "total" pressure obtained at the known or unknown air speed.

In testing an altimeter, the first-mentioned transducer is rotated ("dialed") from its null position about the axis of the related Bourdon tube a calculated amount corresponding to the rotation of the Bourdon tube and mirror when the altimeter test capsule is exposed to the atmosphere at a predetermined altitude. Test gas is then supplied to the capsule at sufficient pressure to rotate the Bourdon tube this amount, whereupon the regulated test pressure is supplied to the altimeter being tested.

In testing an air speed meter, the absolute atmospheric pressure obtained in the altimeter test is applied to the capsule of the second pressure unit, while the so-called total or pitot tube pressure corresponding to a definite known air speed is applied to the interior of the Bourdon tube. Again, the transducer is rotated a calculated amount corresponding to a predetermined total pressure and sufficient pressure built up inside the Bourdon tube to again obtain the null reading. The regulated total pressure and the simulated barometric pressure previously obtained are then applied to the air speed meter so that it may be properly calibrated.

Figure 2:
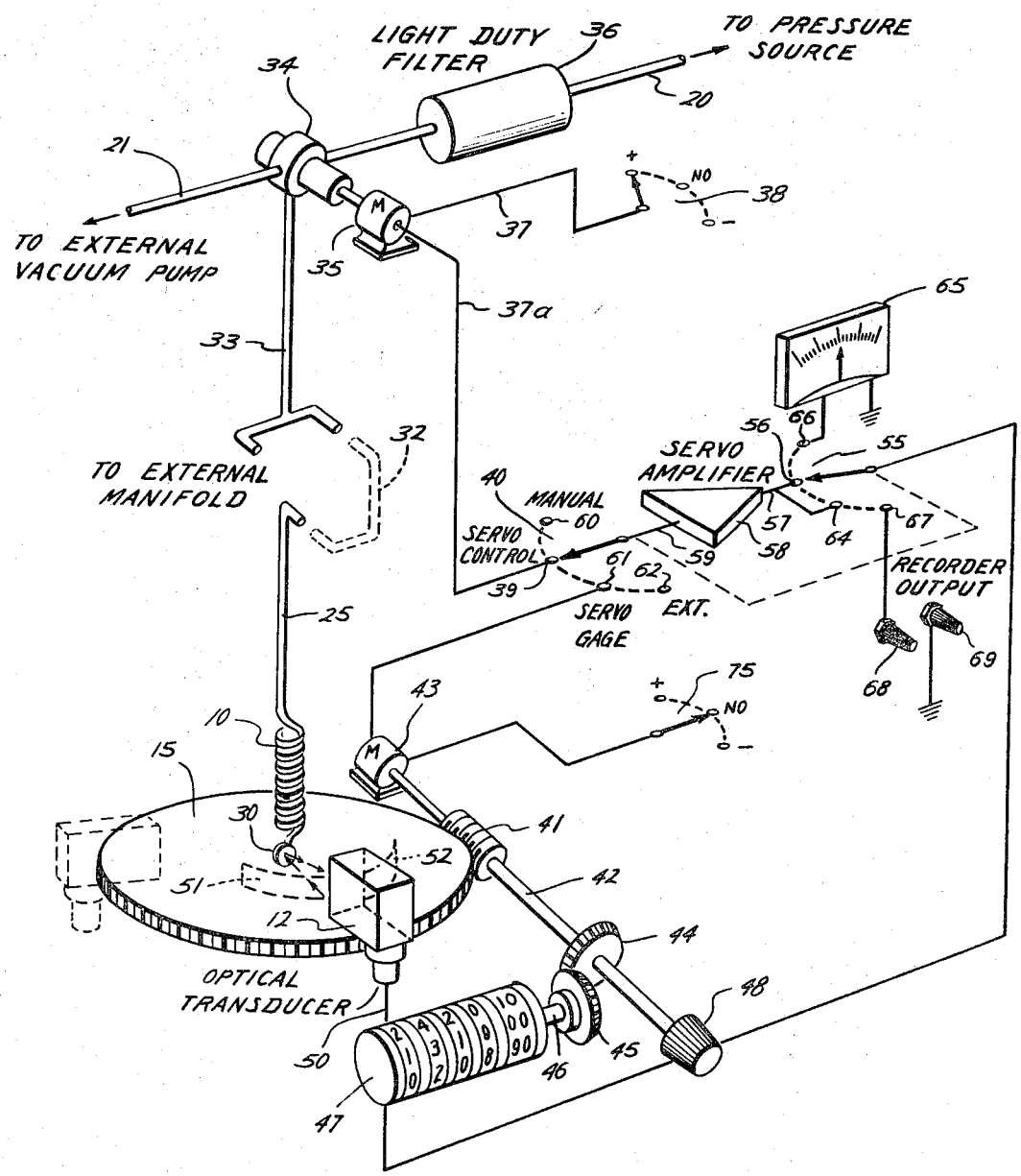

In the accompanying drawings,

FIG. 1 is a schematic block diagram illustrating the various elements and their hookup in the new air data test set; and FIG. 2 is a schematic representation showing one of the automatic pressure measuring and/or controlling units, both units being identical.

FIG. 1 illustrating a pair of automatic pressure measuring and/or controlling devices A and B, both of which preferably, are mounted compactly in a suitable cabinet provided with fittings 5, 6, 7, 8, and 5a, 6a, 7a, and 8a for various fluid lines, as will be explained. Within the cabinets are sealed capsules 9 and 9a, preferably of glass, encompassing special fused quartz Bourdon tubes 10 and 10a supported from capsule covers 11 and 11a beneath which are rotatably mounted optical transducers 12 and 12a electrically connected through amplifiers 13 and 13a to regulators 14 and 14a. While in schematic FIG. 1 the transducers appear to be mounted in the capsule walls, actually they are mounted on rotatable carriers beneath the capsules, one being shown at 15 in FIG. 2. The regulators are interconnected by piping 16 and 17, in turn respectively connected to a vacuum pump 18 and a source 19 of pressured dry gas by pipes 20 and 21. It will be recognized that the units A and B are substantially identical, but are provided with different piping connections 22, 23, 24, 25, and 26, as will be explained. The upper, supported end of Bourdon tube 10a is plugged as at 27.

FIG. 2 illustrates in greater detail and schematically the functioning parts of units A, although unit B is constructed similarly except for the piping connections. Corresponding parts of unit B bear the same reference numerals with the letter suffix a, except where noted. Bourdon tube 10 carries a small mirror 30 at its lower end. Mounting and construction of the Bourdon tube is such that variation of the pressures inside and/or outside, that is, across the Bourdon tube, causes winding or unwinding of the coils of the tube and rotation of mirror 30 about the tube axis. The interior of the Bourdon tube is connected by piping 25, 32, and 33 to regulator valving 34 controlled by a motor 35. Valving 34 is connected by piping 21 to vacuum pump 18 and by piping 20 including a filter 36 to fluid pressure source 19. Motor 35 is provided with control wiring 37 and 37a leading to the arm of manual override switch 38 and a contact 39 of servo control switch 40.

Rotatably mounted beneath mirror 30 and centered with respect thereto is the transducer carrier worm gear 15 which is driven in either direction by a worm 41 on a shaft 42 projecting from motor 43. Also rigid with shaft 42 is a bevel gear 44 which meshes with a pinion 45 on shaft 46 to operate the digital counter 47. A knob 48 on the free end of shaft 42 provides for manually rotating worm 41 and transducer carrier wheel 42 together with counter 47. Provision is made, as illustrated in the before-mentioned patent and not herein shown, for shifting worm wheel 15 independently of the counter.

Mounted at the periphery of worm wheel 15 is the transducer 12 which, according to the before-mentioned patent, includes a light source beamed toward mirror 30 and accurately balanced photoelectric cells arranged to receive equal quantities of reflected light from mirror 30 when the transducer and mirror are in a predetermined relationship. The photoelectric cells are wired so that their output is zero when they are subjected to equal quantities of light, while their output, delivered through wiring 50, is negative or positive depending upon the deflection of mirror 30 from the aforementioned null position. Additional photoelectric cells are mounted sidewardly of the transducer body, as at 51 and 52, for extending the angular range of automatic operation of the gauge. The angularity of relative deflection of the mirror and transducer is readily translated to pressure variation across the Bourdon tube and is directly read on digital counter 47 either in pressure or a related parameter.

Wiring 50 from transducer 12 extends to the arm of a switch 55 which may connect through its contact 56 and a wire 57 to a servo amplifier 58, thence through wire 59 to the arm of switch 40. Contact 39 of the latter switch is connected by wiring 37a to motor 35, as previously explained. Switch 40 also has an open contact 60 and additional contacts 61 and 62, respectively, for directing the servo amplifier output to transducer carrier motor 43 and to an external operation. Switch 55 has additional contact 66 leading to a microammeter or null meter 65 while contact 67 leads to jack 68 and jack 69 is connected to ground. Jacks 68 and 69 on the instrument panel are for connection to a recorder.

In operation for testing and calibrating, for instance, an altimeter, the interior of Bourdon tube 10a of unit B (FIG. 1) will be highly evacuated and its fitting 5a plugged, as at 27. Reference is made to FIG. 2 for mechanical parts, although in unit B, piping 79 to regulator 14a connects with the interior of capsule 9a rather than with the Bourdon tube. Starting from a null positioning of transducer 12a, that is, a position wherein meter 65 registers zero, if the arm of switch 55 is on contact 66, and wire 50 is not energized, the gauge 9a will be "dialed," e.g., knob 48 will be turned to rotate the transducer-carrier worm wheel by the angular degree, as indicated on the counter previously calculated as corresponding to the absolute atmospheric pressure existing at a predetermined altitude, say 5,000 feet above sea level. Now, with the arm of the meter switch (55 in FIG. 2) on its servo contact (56), since optical transducer 12a no longer will be in its null position, light reflected from mirror 30a will fall unevenly on the mentioned photoelectric cells within and beyond the transducer, which will cause the transmission of a current through line 50. This current, amplified, will be directed through servo control switch contact 39 to motor 35 causing operation of regulator valving 34, which is part of the regulator 14a shown in FIG. 1, to deliver vacuum from pump 18 through piping 21 and 16, the regulator piping, and fitting 6a to the space in capsule 9a about Bourdon tube 10a. When this pressure is lowered sufficiently to cause rotation of mirror 30a to its null relationship with respect to optical transducer 12a, current output through line 50, etc., will be discontinued. This pressure standard will be maintained constant by the regulator and supplied through piping 22 to the altimeter being calibrated.

Of course, the polarity of the current supplied through line 50 will be such as to operate motor 35 in the proper direction to supply either pressured fluid or vacuum to the interior of capsule 9a to insure rotation of mirror 30a in the proper direction to approach its null position. For instance, if the initial pressure within the capsule is lower than the test pressure, valving 34 will be operated so as to connect pressure line 20 to fitting 6a, thus increasing the pressure within the capsule. An altimeter calibration may involve checking the instrument at 5,000-foot increments which, of course, will involve reducing the capsule pressure to 24.897 inches Hg at 5,000 feet, 20.580 inches Hg at 10,000 feet, 16.893 inches Hg at 15,000 feet, etc.

To provide a test standard pressure for an air speed meter at a particular altitude, the interior of capsule 9 (FIG. 1) is charged at the absolute pressure existent at that altitude. The transducer-carrier worm wheel associated with capsule 9 is then "dialed," that is, rotated, the calculated angular degree corresponding to the Bourdon tube deflection which should result when the Bourdon tube is subjected to the total or pitot tube pressure at a predetermined test air speed at that altitude. For this purpose, the absolute atmospheric pressure at the altitude being considered, as generated by unit B, is transmitted by branch line 26 to fitting 5. Then, servo amplifier 13 and regulator 14, including previously-mentioned parts 55, 58, 40, 35, and 34 of FIG. 2, will be operated to automatically direct pressure fluid from source 19 or vacuum from pump 18 into the interior of Bourdon tube 10 to rotate its mirror 30 to the null position with respect to optical transducer 10. The resultant standard test pressure will be held by the regulator mechanism, as previously explained, and supplied through piping 24 which will be connected to the total pressure fitting of the air speed meter being calibrated, while the absolute atmospheric pressure will be transmitted through line 23 to its proper fitting. As before, incremental air speeds will be checked to fully calibrate the air speed unit.

By corresponding general procedures, other absolute and differential pressure instruments may be calibrated by the novel test apparatus, including mach meters and pressure ratio transducers. Importantly, the instrument also may be utilized as easily to accurately measure unknown parameters, e.g., to simulate an accurately-calibrated altimeter air speed meter, or the like. For instance, to measure the correct altitude and, therefore, countercheck an altimeter, it is simply necessary to connect line 22 (FIG. 1) to the area of unknown pressure being concurrently applied to the altimeter and shift switches 55 and 40 to contacts 66 and 60. This will cause a certain angular rotation of mirror 30a, whereupon transducer 12a may be manually rotated by means of knob 48 (FIG. 2) the necessary angularity, as read on counter 47, to produce a null reading on meter 65, the counter reading, of course, indicating the altitude. The same result may be achieved automatically by shifting the arm of switch 55 from the meter contact to servo contact 56 and the arm of switch 40 from manual contact 60 to servo contact 39. In such case, the transducer will actuate motor 35 and valving 34 to provide the necessary rotation of the carrier worm gear to return the transducer to its null position.

Similarly, the complete apparatus can be utilized to measure true air speed, as for checking an air speed meter, by applying absolute pressure at the particular altitude to line 22 and exposing fitting 6 to the pitot tube pressure. Mirror 30 will be deflected an amount corresponding to the difference between the absolute and the unknown total pressure and the transducer carrier disk rotated, either manually or automatically, to its null position with respect to mirror 30. The unknown air speed may then be read upon or computed from counter 47 for comparison with the contemporaneous reading of the air speed meter being tested.

If desired, when the instrument is being used as a datum pressure generator, the absolute (barometric) pressure may be held constant and the simulated air speed varied by dialing the transducer-carrying worm wheel associated with capsule 9, or the air speed simulation may be held constant while the altitude pressure applied to line 22 is varied by manipulation of transducer-carrier worm wheel associated with capsule 9. This manner of operation cannot be readily achieved by any prior art data calibration system, and its achievement in the present system is another substantial advantage thereof.

In addition, pressure drive override switches 38 and 75 permit slight deflections of the Bourbon tube mirror and carrier wheel 40 in opposite directions to check hysteresis of the tranducer. Counter 47 can readily provide for as many as 100,000 digital readings or more, a resolution practically impossible of achievement in manometric or dead weight types of air data test instruments. As previously explained, no corrections are necessary for barometric pressure, gravity, or temperature when the instrument is used within the environmental limits for which it is intended. The fused quartz Bourbon tubes are very stable and will maintain their calibrations over long periods of time. Maintenance of the system is limited to adjustment of servo amplifier 58 both for gain and damping and an occasional lamp replacement. This is another very substantial advantage over prior art types of air data test devices. The herein-described test instrument is compact, rugged, and portable to an extent heretofore not achieved in similar instruments. Of course, calibration of an air data computer or other instrument is exceptionally simple due to the elimination of the usual corrections and the simplified nulling procedure.

Another important advantage is that, with the use of our novel test apparatus, a pressure function may be applied to either test unit as by energizing the photocell output in accordance with such function. This would be very difficult of accomplishment with prior art test devices.

The novel air data test instrument as herein described may be modified in various respects as will occur to those skilled in the art, and the exclusive use of all modifications is contemplated.

What is claimed is:

1. Air data test apparatus for testing air data instruments comprising first and second devices for establishing gaseous pressures, said first and second devices each including a Bourbon tube, means included with said first and second devices for subjecting said instruments under test to said gaseous pressures, means in said second device for regulating and indicating absolute pressure and means in said first device for regulating and indicating the algebraic difference between said absolute pressure and the total pressure.

2. Air data test apparatus as described in claim 1 including a fluid connection between said devices whereby the absolute pressure in said second device may be utilized as one of the gaseous pressures in said first device.

3. Air data test apparatus as described in claim 1 in which the Bourbon tubes are quartz and said devices each have chambers within and outside its Bourbon tube for independent application of gaseous pressures to be sensed.

4. Air data test apparatus as described in claim 3 further including means for individually adjusting any of the gaseous pressures applied to said devices by measured amounts while maintaining the remaining gaseous pressures constant.

5. Air data test apparatus as described in claim 4 in which said adjusting means comprise an optical transducer system responsive to pressure variations across said Bourbon tubes, each transducer system comprising a light source, a mirror, at least two photoelectric cells, and a transducer carrier, said cells being positioned and wired to produce a null current when said cells, light source, and mirror are in predetermined relationship to equally expose said cells to light from said source, and to produce a current varying in sense when said transducer parts are in a different relationship wherein said cells are unequally exposed to light from said source.

6. Air data test apparatus as described in claim 5 in which the mirror in each of said transducer systems is connected to the associated Bourbon tube for deflection in accordance with pressure variations across the same, and said cells are carried by said carrier.

7. Air data test apparatus as described in claim 5 further including manual and servo mechanisms for rotating said carrier and a null meter connected to said transducer for registering the null or deflected relationship of said mirror and said cells.

8. Air data test apparatus as described in claim 7 further including pressure fluid and vacuum supply means and regulator means connected to said devices for establishing gaseous pressures, motor means operatively associated with said regulator means, and means electrically connecting said transducers individually to said servo mechanism and said motor means whereby said apparatus can be used to generate accurate gaseous pressures for test application to air data instruments and for measuring unknown gaseous pressures in simulation of the action of properly-calibrated air data instruments.

9. Air data test apparatus comprising:
(a) a first and a second pressure gauge each having a casing forming an outer chamber and a Bourbon tube therein forming an inner chamber,
(b) first and second optical indicator means associated respectively with said gauges each including a mirror movable with the free end of the corresponding tube, a rotating carrier beneath said mirror and concentric therewith, a light source, and a pair of photoelectric cells mounted on said carrier, said mirror, light source, and cells being disposed so that when said carrier and said Bourbon tube are in a predetermined relationship, light from said source will be reflected by said mirror evenly upon said cells,
(c) a source of pressured fluid and a vacuum pump,
(d) a regulator connected to each of said gauges and to said pressure source and vacuum pump,
(e) a first motor and manual means for rotating each of said carriers and a second motor for adjusting each of said regulators,
(f) a null meter for each of said gauges,
(g) wiring connecting said photoelectric cells with said meters and said motors and arranged for the production of null current therein when reflected light from said source falls evenly on said cells and for the generation of a current in said wiring varying in sense in accordance with the direction of relative deflection of the corresponding Bourbon tube and carrier, (h) a counter connected to said carrier, (i) switching in said wiring having a first position for connecting a set of said cells with the corresponding carrier motor to cause nulling movement of the connected carrier with indication of the deflection correcting movement on said counter, and (j) said switching having a second position for connecting a set of said cells to said regulator motor for adjusting the pressures applied to the connected pressure gauge for causing nulling movement of the corresponding Bourbon tube and mirror relative to its previously-moved carrier.

References Cited

UNITED STATES PATENTS

| | | |
|---|---|---|
| 2,893,236 | 7/1959 | Coon et al. |
| 3,045,470 | 7/1962 | Crandell et al. |
| 3,060,718 | 10/1962 | Malkiel. |
| 3,068,700 | 12/1962 | Bourns _____ 73—398 |
| 3,243,990 | 4/1966 | Andresen, Jr. _____ 73—4 |
| 3,262,305 | 7/1966 | Dawley. |
| 3,263,482 | 8/1966 | Shank. |
| 3,266,288 | 8/1966 | Andresen, Jr. et al. |

S. CLEMENT SWISHER, Primary Examiner

Dedication 3,548,632.—*John B. Damrel, Jr.*, and *Jerry L. Fruit*, Houston, Tex. APPARATUS FOR CALIBRATING ALTIMETERS, AIR SPEED INDICATORS, ETC. Patent dated Dec. 22, 1970. Dedication filed Feb. 12, 1971, by the assignee, *Texas Instruments Incorporated*.
Hereby dedicates to the Public the entire term of said patent.
[*Official Gazette August 17, 1971.*]